United States Patent [19]

Wilhelmsen

[11] Patent Number: 5,050,707

[45] Date of Patent: Sep. 24, 1991

[54] AUTOMATIC OILING DEVICE

[76] Inventor: Arne Wilhelmsen, 4897 Patrick Pl., Burnaby, Canada, V5J 3A5

[21] Appl. No.: 468,404

[22] Filed: Jan. 22, 1990

[51] Int. Cl.$^5$ ............................................. F16N 23/00
[52] U.S. Cl. ....................................... 184/87; 184/64; 184/84; 215/231
[58] Field of Search ................ 184/84, 87, 88.1, 92, 184/100, 102, 65; 384/402; 222/187; 431/325; 215/231, 354

[56] References Cited

U.S. PATENT DOCUMENTS

| 133,316 | 11/1872 | Hutchinson, Jr. | 184/64 |
| 350,779 | 10/1886 | Siaddin | 184/87 |
| 2,610,706 | 9/1952 | Jung | 184/87 |
| 3,083,952 | 4/1963 | Goodloe et al. | 431/325 |
| 3,941,283 | 3/1976 | Garbe | 222/187 |

FOREIGN PATENT DOCUMENTS 0113982  3/1918  United Kingdom ................ 215/231

Primary Examiner—Ira S. Lazarus
Assistant Examiner—Alan B. Cariaso
Attorney, Agent, or Firm—Townsend and Townsend

[57] ABSTRACT

An automatic oiling device for delivering oil to a bearing comprising a sealable container defining a reservoir for oil with a opening in which a hollow tube is fitted. One end of the hollow tube communicates with the interior of the sealable container and the other end is open. Wicking material is located in the hollow tube and extends into the interior of the sealable container at one end and extends from the other open end of the hollow tube for contact with a bearing to be oiled. The hollow tube and the wicking material co-operating to function as an automatic valve to release oil from the sealable container as needed by the bearing. The wicking material is packed into the hollow tube to a density sufficient to allow for an automatic valving cycle that controls the flow of oil. The automatic valving cycle involves capillary flow of the oil from the reservoir through the wicking material to the bearing, the flow of oil lowering pressure in the sealable container which eventually results in the capillary flow being curtailed, whereupon the lowered pressure in the sealable container is sufficient to draw air through the wicking material and into the sealable container to increase the pressure in the sealable container such that capillary flow resumes and the automatic valving cycle is repeated.

7 Claims, 1 Drawing Sheet

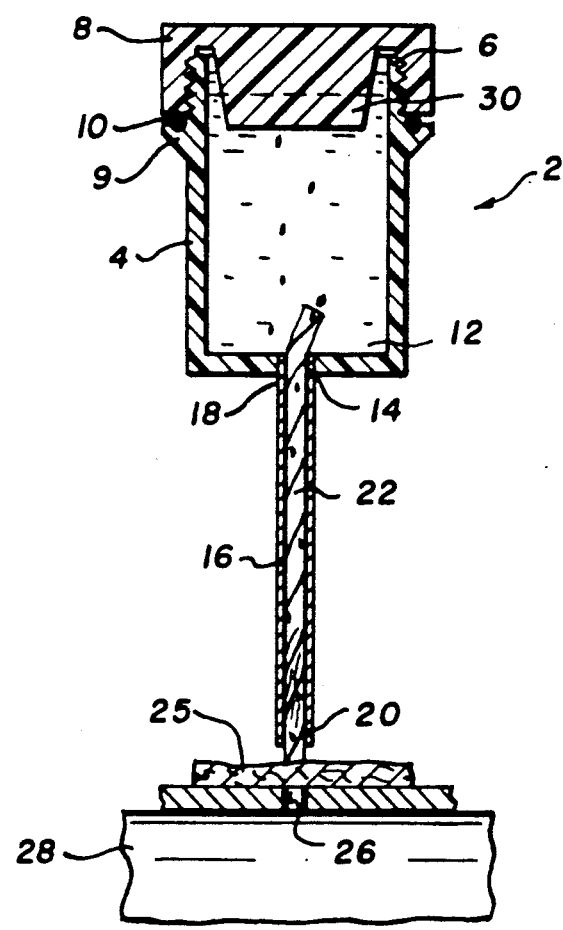

AUTOMATIC OILING DEVICE

FIELD OF THE INVENTION

This invention relates to an automatic oiling device for lubricating bearings and the like.

BACKGROUND OF THE INVENTION

Proper lubrication is an important part of ensuring that bearings run smoothly and trouble free. Particularly in the plumbing industry, where sleeve bearing electric motors and water circulator pump bearings are common, there is a constant problem with bearing failures. The main cause of bearing breakdowns is usually insufficient or improper manual lubrication. Manual oiling is often forgotten or, because of a range of factors that affect oiling requirements such as temperature, continuous or intermittent operation and altitude, is done improperly.

Prior art devices have been developed that allow for automatic oiling or greasing of bearings to alleviate the problem of insufficient lubricating. Generally, these devices employ wick lubricators that are mounted atop the bearing to be lubricated and deliver oil or grease from a reservoir to the bearing packing system or directly to the bearing surface. Examples of such prior art lubricating devices are shown in the following United States patents:

U.S. Pat. No. 133,316 to Hutchinson, Jr.
U.S. Pat. No. 518,058 to Finch
U.S. Pat. No. 746,243 to Baggaley
U.S. Pat. No. 817,084 to Moore et al.
U.S. Pat. No. 955,608 to Shortt
U.S. Pat. No. 983,025 to Chalmers
U.S. Pat. No. 1,171,681 to Weckwerth et al.
U.S. Pat. No. 1,328,209 to Sharp
U.S. Pat. No. 1,409,644 to Baker
U.S. Pat. No. 1,632,874 to Blount
U.S. Pat. No. 2,185,622 to Bauman
U.S. Pat. No. 2,850,336 to Dochterman The majority of these devices rely on simple capillary flow of lubricating material through the wicking material to deliver a constant flow of lubricant to the bearing. In fact, the oiling device of Dockterman relies on a spring pressurized oil reservoir to constantly feed oil through the wicking material. All the devices of the prior art adequately address the problem of insufficient lubrication of a bearing by providing a device that is always in place. However, a new problem arises in that the prior art devices tend to supply lubricant to the bearings whether it is needed or not leading to wastage of lubricant and making a large lubricant reservoir necessary for long periods of unattended operation.

The prior art devices known to applicant date back to the early part of this century and are clearly intended for large scale machinery where large amounts of lubricating material is necessary.

Accordingly, there is a need for a smaller scale oiling device that can be used to lubricate the sleeve bearings of today's smaller electric motors and similar bearings. The smaller scale of these motors and their often intermittent operation makes supplying a constant flow of lubricant to the bearing unnecessary and undesirable. In recent years, electric oilers have been developed that employ a valve to release a small quantity of oil at timed intervals preset by the operator, but these devices are complex and very expensive to purchase and install.

SUMMARY OF THE INVENTION

The present invention provides an inexpensive and easily installable automatic oiling device that has no moving parts and automatically meters oil to a bearing as needed to avoid the problem of over oiling.

The apparatus of the present invention is an automatic oiling device for delivering oil to a bearing comprising:

a sealable container defining a reservoir for oil, said container having an opening therein;

a hollow tube having first and second ends, said first end extending from said opening and communicating with the interior of said sealable container and said second end being open;

wicking material in said hollow tube that extends into the interior of said sealable container at said first end and extends from said open second end of said hollow tube for contact with a bearing to be oiled;

said hollow tube and said wicking material co-operating to function as an automatic valving means to release oil from said sealable container as needed by said bearing, said wicking material being packed into said hollow tube to a density sufficient to allow for an automatic valving cycle that controls the flow of oil involving capillary flow of said oil from said reservoir through said wicking material to said bearing, said flow of oil lowering pressure in said sealable container which eventually results in said capillary flow being curtailed whereupon the lowered pressure in said sealable container is sufficient to draw air through said wicking material and into said sealable container to increase the pressure in said sealable container such that capillary flow resumes and the automatic valving cycle is repeated.

BRIEF DESCRIPTION OF THE DRAWINGS

An embodiment of the present invention is illustrated, by way of example, in the accompanying drawing which shows a section view through the apparatus of the present invention while in place on a bearing to be lubricated.

DESCRIPTION OF THE PREFERRED EMBODIMENTS

An automatic oiling device 2 according to the present invention is shown in the single FIGURE. The device comprises a sealable container 4 defining a reservoir for a lubricating material such as oil. The upper end 6 of the container is threaded and accepts a removable screw cap 8. The container is moulded with an upper sealing shoulder 9 that supports O ring 10 to ensure that the container is properly sealed when screw cap 8 is tightened into place atop the sealing shoulder. Preferably, container 4 is formed from clear, high impact nylon and O ring 10 is made from nitril rubber.

The lower end 12 of the container is formed with a central opening 14. A hollow tube 16 extends from the opening and communicates the interior of the sealable container with the exterior. First end 18 of tube 16 is located in opening 14 while the second end 20 of the tube is open and extends outwardly from the lower end of the sealed container. It is not necessary that opening 14 be centered in the lower end of the container. A non-centered opening often allows for easier installation in restricted areas.

Hollow tube 16 is packed with wicking material 22. The wicking material extends into the interior of the sealable container at central opening 14 and extends from open second end 20 of the hollow tube to provide a passageway for the oil. The wicking material contacts the bearing to be oiled when in an operating position.

As shown in the FIGURE, current sleeve bearing designs generally use a fibrous packing system of all felt packing or a combination of permawick and felt packing. Permawick is a porous ground material that is mixed with oil. The sleeve bearing packing 25 acts a reservoir for oil and a felt wick 26 protrudes from the reservoir packing through a slot and makes contact with the revolving shaft or journal 28 within the sleeve bearing. The sleeve bearing is provided with an oil hole (not shown) that allows access to the fibrous packing system. Hollow tube 16 is designed to be inserted into this oil hole to provide oil to the fibrous packing system. Alternatively, the wicking material protruding from end 20 of tube 16 can be placed directly in contact with the rotating shaft.

Wicking material 22 is preferably strands of 100 percent wool having a gauge/tension designation of 14 sts.—18 rows=4 inches according to the standard identification method of the wool industry. This standard identification method refers to knitting a standard test pattern of 14 stitches (sts.) in 18 rows to create a pattern that is 4 inches long if knitted at the correct tension. The wool strands are inserted within hollow tube 16.

Wicking material 22 and hollow tube 16 cooperate to function as an automatic valve to release oil from the sealable container as needed by the bearing. Wicking material 22 is packed within hollow tube 16 to a density sufficient to lead to an automatic valving cycle being created in the automatic oiling device of the present invention. This automatic oiling cycle is best understood by following the steps necessary to set up the automatic oiling device and the actual operation of the device once set up.

The initial step involves filling sealable container 4 to a level shown by an indicator line marked on the container just above seating shoulder 9. In the Figure, this indicator line is covered by screw cap 8. It is important that the sealable container be filled to the indicated level so that the automatic valve cycle can be properly established.

Screw cap 8 is then tightened down against O ring 10 and seating shoulder 9. Preferably, screw cap 8 is formed within a raised internal surface 30 that fits within the sealable container when the cap is tightened in place. Internal surface 30 acts to displace oil in the sealable container thereby applying a slight pressure to the contents of the container.

Hollow tube 16 of the automatic oiling device is then inserted into the oil lubrication hole of a sleeve bearing bracket to be lubricated. The wicking material 22 protruding from the hollow tube must contact the bearing to be lubricated or the sleeve bearing packing. If a screw cap 8 having an raised internal surface 30 is tightened onto the sealable container, the resulting pressurization of the oil will tend to force oil down through the wicking material within the hollow tube so that oil actually drips from the wicking material initially. This allows for immediate delivery of oil to a bearing and ensures that a dry bearing will receive immediate lubrication. It has been found with prototype oiling devices according to the present invention that oil will start to drip within 10 minutes of the screw cap being tightened and continue dripping for approximately fours hours supplying 18-20 drops of oil in total.

Eventually, the oil level in the sealable container will drop so that the oil is no longer under pressure. Alternatively, the oil may not have been pressurized using a cap having a raised internal surface. At this stage, the automatic valving cycle of the present apparatus comes into play. Oil travels through the wicking material by capillary action to be delivered directly to the bearing or to the bearing packing. O ring 10 prevents air from entering sealable container 4 about screw cap 8. Therefore, as oil is delivered to the bearing and the level in the sealable container drops, a low pressure area develops in the upper region of the sealable container just below the screw cap. This low pressure area tends to slow the advance of oil through the wicking material. Oil is only fed through the wicking material when the bearing packing or the actual bearing is dry enough that the resulting capillary attraction of the bearing packing or actual bearing is sufficiently strong to overcome the low pressure region tending to hold the oil in the sealable container. Eventually, as oil is used up, the low pressure region at the upper end of the container will prevent any oil from leaving the sealable container through the wicking material. The wicking material is packed into the hollow tube to a density such that when this point of no oil flow is reached, the low pressure region will actually draw small quantities of air up through the wicking to partially equalize the pressure in the low pressure region, thereby starting the automatic valving cycle over again.

An automatic oiling device having the following dimensions functions in the desired manner. The sealable container is a cylindrical body that has an internal diameter of about 1.3 inches and is about 2 inches deep. The fill level for the sealable container is about 1.4 inches deep. When using a cap having a raised internal surface, the surface is dimensioned to extend about 0.1 inches below the level indicator when screw cap 8 is tightened into place in order that the oil is sufficiently pressurized. Hollow tube 16 is about 2.7 inches long and has an outside diameter of about 0.2 inches and an inside diameter of about 0.1 inches. The wicking material comprises two 8 inch lengths of wool having the previously indicated gauge. The lengths are folded in half to create four 4 inch long strands that are pulled into the hollow tube with the folded ends protruding approximately 3/32 of an inch. This arrangement ensures that the wicking material is packed to the appropriate density to establish the automatic valving cycle.

With the above described arrangement, an appropriate lubricating oil for oiling the bearing to be treated is used. Generally, the lubricating oil will range from a 10 to 40 weight detergent or non-detergent oil. A 20 weight non-detergent oil has been found to work particularly well.

The automatic oiling device of the present invention provides a very simple and inexpensive apparatus for automatically oiling bearings. The device has no moving parts so there is very little wear. Using a transparent or translucent sealable container allows for easy inspection as to when the device requires refilling with oil. A further advantage is the great ease with which the apparatus of the present invention can be installed and maintained.

Although the present invention has been described in some detail by way of example for purposes of clarity and understanding, it will be apparent that certain changes and modifications may be practised within the scope of the appended claims.

I claim:
1. An automatic oiling device for delivering oil to a bearing comprising:
   a sealable container defining a reservoir for oil, said container having an opening therein;
   a hollow tube having first and second ends, said first end extending from said opening and communicating with the interior of said sealable container and said second end being open;
   wicking material in said hollow tube that extends into the interior of said sealable container at said first end and extends from said open second end of said hollow tube for delivering oil to the bearing;
   said hollow tube and said wicking material co-operating to function as an automatic valve to release oil from said sealable container as needed by said bearing, said wicking material being packed into said hollow tube to a density sufficient to allow for an automatic valving cycle that controls the flow of oil involving capillary flow of said oil from said reservoir through said wicking material to said bearing, said flow of oil lowering pressure in said sealable container which eventually results in said capillary flow being curtailed whereupon the lowered pressure in said sealable container is sufficient to draw air through said wicking material and into said sealable container to increase the pressure in said sealable container such that capillary flow resumes and the automatic valving cycle is repeated.

2. An automatic oiler as claimed in claim 1 in which said sealable container is equipped with a removable cap.

3. An automatic oiler as claimed in claim 1 in which said wicking material is 4 strands of wool having a gauge 14 sts.—18 rows=4 inches packed within said hollow tube, said hollow tube having an internal diameter of about 0.1 inches.

4. An automatic oiler as claimed in claim 3 in which said sealable container is made from high impact nylon and has internal dimensions of about 2 inches deep and about 1.3 inches in diameter.

5. An automatic oiling device for delivering oil to a bearing comprising:
   a sealable container defining a reservoir for oil having a removable cap that is provided with a raised internal surface that fits within said sealable container when said cap is tightened in place, said internal surface displacing oil in said sealable container to initially pressurize the oil, and said container having an opening therein,
   a hollow tube having first and second ends, said first end extending from said opening and communicating with the interior of said sealable container and said second end being open;
   wicking material in said hollow tube that extends into the interior of said sealable container at said first end and extends from said open second end of said hollow tube for delivering oil to the bearing;
   said hollow tube and said wicking material co-operating to function as an automatic valve to release oil from said sealable container as needed by said bearing, said wicking material being packed into said hollow tube to a density sufficient to allow for an automatic valving cycle that controls the flow of oil involving capillary flow of said oil from said reservoir through said wicking material to said bearing, said flow of oil lowering pressure in said sealable container which eventually results in said capillary flow being curtailed whereupon the lowered pressure in said sealable container is sufficient to draw air through said wicking material and into said sealable container to increase the pressure in said sealable container such that capillary flow resumes and the automatic valving cycle is repeated.

6. An automatic oiler as claimed in claim 5 in which said wicking material is 4 strands of wool having a gauge 14 sts. —18 rows=4 inches packed within said hollow tube having an internal diameter of about 0.1 inches.

7. An automatic oiler as claimed in claim 6 in which said sealable container is made from high impact nylon and has internal dimensions of about 2 inches deep and 1.3 inches in diameter.

* * * * *